United States Patent
Rottmann et al.

(10) Patent No.: US 10,792,980 B2
(45) Date of Patent: Oct. 6, 2020

(54) PANEL FOR A VEHICLE INTERIOR AND VENTILATION ARRANGEMENT FOR A MOTOR VEHICLE

(71) Applicant: Volkswagen Aktiengesellschaft, Wolfsburg (DE)

(72) Inventors: Johannes Rottmann, Suepplingenburg (DE); Volker Tietz, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 401 days.

(21) Appl. No.: 15/397,295

(22) Filed: Jan. 3, 2017

(65) Prior Publication Data

US 2017/0113516 A1   Apr. 27, 2017

Related U.S. Application Data

(63) Continuation of application No. PCT/EP2015/060077, filed on May 7, 2015.

(30) Foreign Application Priority Data

Jul. 3, 2014  (DE) .......................... 10 2014 212 978
Oct. 1, 2014  (DE) .......................... 10 2014 219 902

(51) Int. Cl.
  *B60H 1/34*       (2006.01)
  *B60R 13/02*      (2006.01)
(52) U.S. Cl.
  CPC ............. *B60H 1/3421* (2013.01); *B60H 1/34* (2013.01); *B60R 13/02* (2013.01)
(58) Field of Classification Search
  CPC .......... B60H 1/3421; B60H 1/34; B60R 13/02

USPC ......................................................... 454/155
See application file for complete search history.

(56) References Cited

U.S. PATENT DOCUMENTS

| | | | |
|---|---|---|---|
| 3,377,144 A | 4/1968 | Lannert | |
| 7,133,206 B2 | 11/2006 | Shibukawa et al. | |
| 7,887,400 B2 * | 2/2011 | Shibata ................ | B60H 1/3421 454/121 |
| 8,424,947 B2 | 4/2013 | Pandura et al. | |
| 2001/0014583 A1 | 8/2001 | Bergholtz | |
| 2006/0169099 A1 | 8/2006 | Diez | |
| 2009/0286462 A1 * | 11/2009 | Goto .................... | B60H 1/3428 454/155 |
| 2010/0283283 A1 | 11/2010 | Takeda | |
| 2011/0181066 A1 | 7/2011 | Pandura et al. | |
| 2012/0083195 A1 * | 4/2012 | Gruedl ................. | B60H 1/3414 454/155 |

(Continued)

FOREIGN PATENT DOCUMENTS

| | | |
|---|---|---|
| CN | 201 354 035 Y | 12/2009 |
| CN | 102133850 A | 7/2011 |
| CN | 103204045 A | 7/2013 |

(Continued)

*Primary Examiner* — Edelmira Bosques
*Assistant Examiner* — Dana K Tighe
(74) *Attorney, Agent, or Firm* — Muncy, Geissler, Olds & Lowe, P.C.

(57) ABSTRACT

A panel for a vehicle interior having a plurality of lamellas fastened to a support piece of the panel. At least one of the lamellas is engaged from behind in at least some sections on a side of a light absorption compartment facing away from the support piece. A ventilation arrangement for a motor vehicle is also provided.

12 Claims, 1 Drawing Sheet

(56) References Cited

U.S. PATENT DOCUMENTS

2013/0210331 A1    8/2013    Krammer

FOREIGN PATENT DOCUMENTS

| | | |
|---|---|---|
| DE | 28 14 627 C2 | 12/1979 |
| DE | 196 54 416 C1 | 5/1998 |
| DE | 20 2009 004 224 U1 | 6/2009 |
| DE | 10 2010 011 548 A1 | 9/2011 |
| DE | 10 2012 015 748 A1 | 2/2014 |
| JP | S 57-86812 U | 5/1982 |
| JP | 2006-207814 A | 8/2006 |
| WO | WO 2009/081695 A1 | 7/2009 |

* cited by examiner

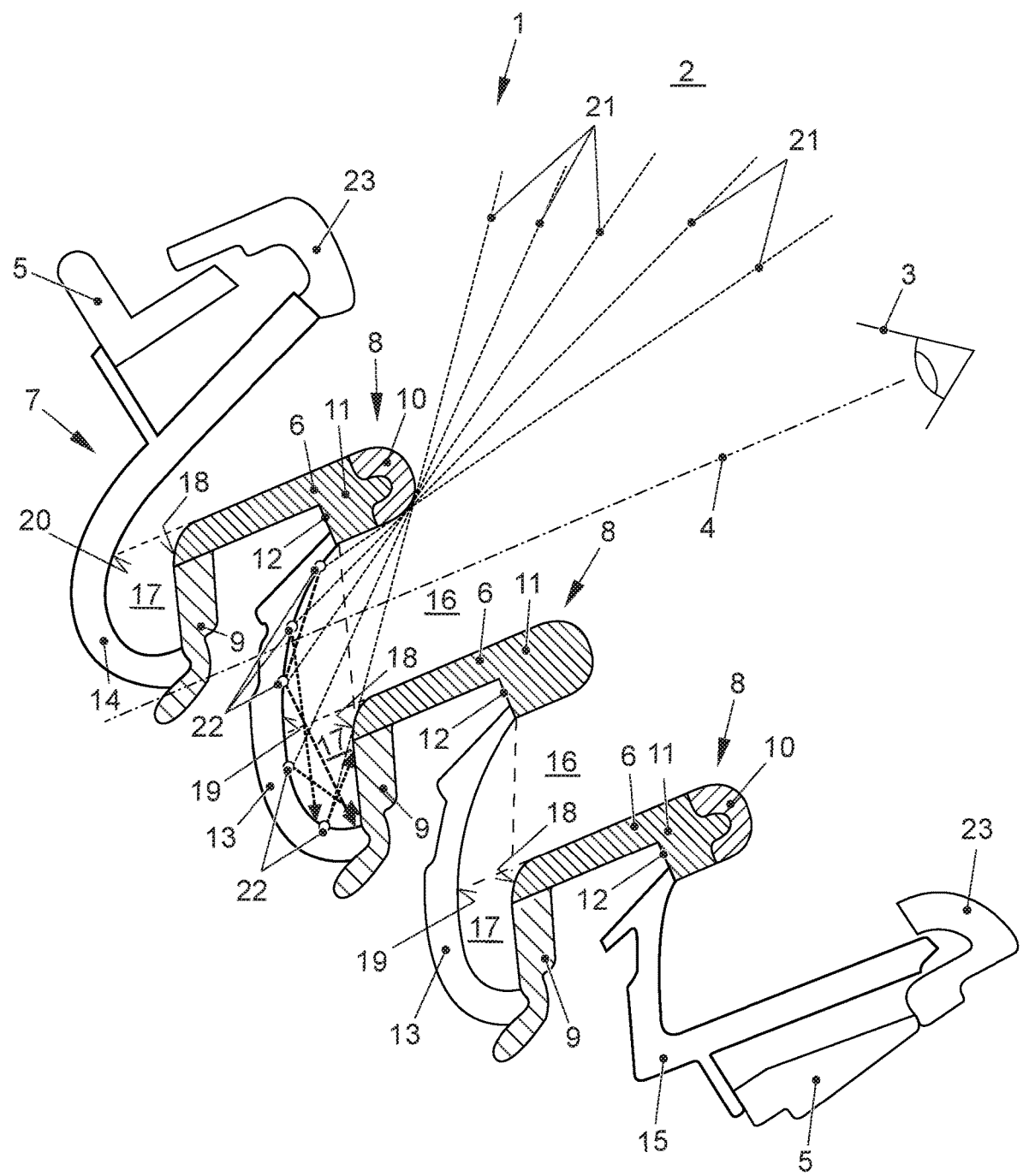

PANEL FOR A VEHICLE INTERIOR AND VENTILATION ARRANGEMENT FOR A MOTOR VEHICLE

This nonprovisional application is a continuation of International Application No. PCT/EP2015/060077, which was filed on May 7, 2015, and which claims priority to German Patent Application No. 10 2014 212 978.8, which was filed in Germany on Jul. 3, 2014, and to German Patent Application No. 10 2014 219 902.6, which was filed in Germany on Oct. 1, 2014, and which are herein incorporated by reference.

BACKGROUND OF THE INVENTION

Field of the Invention

The invention relates to a panel for a vehicle interior comprising a plurality of lamellas, fastened to a support piece of the panel. The invention relates further to a ventilation arrangement for a motor vehicle.

Description of the Background Art

A panel is typically disposed in the vehicle interior and is used there, for example, to cover a structural element of the motor vehicle. In this respect, the panel is used to improve a visual impression and the value of the vehicle interior. In this respect, the panel can also be called a decorative panel or decorative part.

The panel can be part of the ventilation arrangement, which has at least one vent outlet. The vent outlet serves to bring air into the vehicle interior, for example, fresh air and/or air taken from the vehicle interior, in other words, therefore, recirculating air. The vent outlet preferably has at least one vent lamella, preferably a plurality of vent lamellas, which, for example, are movable, in particular pivotable, in order to influence the flow direction of the air flowing through the vent outlet into the vehicle interior. Depending on the position of the lamellas, the air therefore flows with different flow vectors into the vehicle interior.

The panel is now provided in particular to conceal the vent outlet and to integrate it visually in an attractive manner into the vehicle interior. In this regard, preferably the appearance of the vent outlet should be continued or recreated. To this end, the panel has the plurality of lamellas, whereby for example, each vent lamella is associated with precisely one or at least one lamella of the panel. This lamella is arranged such that it represents a visual extension of each associated vent lamella. For example, the panel has as many lamellas as the ventilation arrangement has vent lamellas. Whereas the vent lamellas, as already described, can be made movable, the lamellas of the panel are preferably rigidly attached.

Both the lamellas of the panel and the vent lamellas of the vent outlet are preferably arranged parallel to one another at least in some areas, whereby the planes formed by the lamellas do not intersect one another or are arranged parallel to one another. This need not be the case necessarily, however, so that in an alternative embodiment planes formed by the lamellas can intersect at a specific angle.

The lamellas of the panel are fastened to the support piece, whereby the support piece, for example, can correspond to the structural element of the motor vehicle or be fastened to it. The lamellas extend proceeding from the support piece in the direction of the vehicle interior, whereby its side facing the vehicle interior or the side facing away from the support piece is present as a free end. In simple embodiments of the panel in which the lamellas proceeding from the support piece extend in the direction of the vehicle interior, disturbing light reflections can arise, when light coming from the vehicle interior is reflected by the lamellas and/or the support piece. This reflected light can be reflected back to an observer, for example, a driver of the motor vehicle, and in this respect cause disturbing highlights on the panel.

The publication DE 196 54 416 C1, for example, is known from the state of the art. It describes a panel for the interior of a vehicle, with a grid-like surface, which is provided with passages in at least one subregion, whereby the panel can be inserted into an interior trim or an instrument panel and whereby the subregion with passages covers an opening of an air conduit running within or behind the interior trim or instrument panel. In order to reduce the material usage and to simplify installation, at least one other subregion of the grid-like surface is provided with passages, which region covers a sound element located in a recess of the interior trim or instrument panel.

SUMMARY OF THE INVENTION

It is therefore an object of the invention to provide a panel for a vehicle interior, which has advantages over the prior art, in particular reduces or even totally prevents the occurrence of reflections or highlights on the panel.

In an exemplary embodiment is provided that at least one of the lamellas on a side facing a support piece is engaged from behind by a light absorption compartment at least in some areas. The side facing the support piece can be understood to be, when viewed in cross section, a side facing away from the vehicle interior or an end of the particular lamella, said end facing away from the vehicle interior. The lamella has an end face on the aforementioned side. The light absorption compartment can be arranged directly adjacent to the end face, so that therefore the lamella or its end face delimits the light absorption compartment at least partially. It can also be provided, however, that the light absorption compartment is spaced apart from the lamella or its end face, whereby this is the case in particular on the side facing away from the vehicle interior. Stated differently, it is provided according to the invention that an end face, facing the support piece, of at least one of the lamellas is engaged from behind by a light absorption compartment at least in some areas.

The panel or the lamellas are configured such that a major part of the light beams directed between the lamellas are reflected in the direction of the light absorption compartment or into it. The light absorption compartment is designed such that the light beams can again pass out of it at least not directly or pass past the lamellas. The light absorption compartment in this respect serves as a light trap, so that the aforementioned highlights on the lamellas and/or the support piece are prevented. The shape of the light absorption compartment is selected, for example, such that light that comes in through a gap between directly adjacent lamellas and enters the light absorption compartment and is reflected there on a boundary of the light absorption compartment strikes the boundary at least one more time. Because the intensity of the light decreases with each reflection, the intensity of the light perhaps coming out of the light absorption compartment, which can be called residual light, is low such that it is not noticed or at least not perceived as disturbing by an observer.

The light absorption compartment, when viewed in cross section, can be formed on the side, facing away from the vehicle interior, of the lamella. For example, it can be located between the lamella or its end face and the support piece, for example, it is formed jointly by these. It is therefore not the case that the end faces of the lamellas are connected to one another by the shortest path in order to hold the lamellas on the support piece. Rather, the end face of the at least one lamella is preferably spaced apart from the support piece in order to form the light absorption compartment.

The light absorption compartment, when viewed in cross section, has an outlet opening, which is located in particular between a connecting element, on the one side, and the lamella or the end face, facing the connecting element, of the lamella, on the other. The lamella is connected to a directly adjacent lamella via the connecting element. The connecting element can limit the light absorption compartment at least in some areas; in particular, the light absorption compartment, when viewed in cross section, lies between the connecting element and the lamella. Preferably the outlet opening can lie substantially in the same plane as the lamella. The light absorption compartment in this respect is, for example, U-shaped in cross section, the outlet opening being enclosed between the legs of the light absorption compartment. The outlet opening lies preferably in a plane, in which a top side as well lies, in particular a flat top side, which is engaged from behind by the light absorption compartment.

The depth of the light absorption compartment, when viewed in cross section, corresponds preferably to at least 25%, at least 50%, at least 75%, or at least 100% of the minimal distance between directly adjacent lamellas between which the light absorption compartment opens. The depth of the light absorption compartment thereby corresponds, for example, to the distance between the outlet opening and a deepest base of the light absorption compartment, in particular the distance between the outlet opening and the point of the light absorption compartment that is farthest from the outlet opening.

The width of the light absorption compartment is, for example, at least 5%, at least 10%, at least 15%, at least 20%, at least 25%, or at least 50% of the length of the lamella that it is associated with or it engages from behind. The width of the light absorption compartment is, for example, the width of the outlet opening, when viewed in cross section, therefore, the distance between the lamella that the light absorption compartment engages from behind and the connecting element. Stated differently, the width of the light absorption compartment can correspond to the minimal distance between the lamella, engaged from behind, and the connecting element.

To improve the effect of the panel or the light absorption compartment, the boundary of the light absorption compartment or a wall forming said boundary can be made matte to reduce the intensity of the incident light as rapidly as possible. Because the light absorption compartment undertakes such a reduction with a high efficiency, however, the boundary or wall can also not be made matte at least in some areas, in particular completely, and therefore be made smooth, for example.

In an embodiment of the invention, it is provided that the light absorption compartment originates from an interspace bounded by adjacent lamellas. When viewed in cross section, adjacent lamellas, in particular directly adjacent lamellas, delimit the interspace or enclose it between each other. The interspace now opens into the light absorption compartment. Of course, it can also be said that the light absorption compartment represents a region of the interspace or the interspace forms a region of the light absorption compartment. When viewed in cross section, the light absorption compartment is formed as a pocket or as a pouch. It is therefore closed on the sides facing away from the interspace.

In an embodiment of the invention, it is provided that the adjacent lamellas are arranged one above the other and the light absorption compartment engages a bottom and/or top lamella from behind. Adjacent lamellas are to be understood particularly preferably as directly adjacent lamellas. Therefore, there is no other lamella between these lamellas. The adjacent lamellas are arranged one above the other and in this case enclose the aforementioned interspace between them. It can now be provided that the light absorption compartment engages either the bottom or top lamella from behind, whereas the other lamella in each case is not engaged from behind and, for example, adjoins the support piece directly. Of course, it can also be provided, however, that the light absorption compartment engages both the bottom and top lamella from behind. In this case, it can also be said that two light absorption compartments originate from the interspace.

In an embodiment of the invention, it is provided that there is at least one lamella on a lamella element that has a holding element angled relative to the lamella. In cross section in regard to a longitudinal extension of the lamellas, therefore, there is to be an angle that is different from 0° or 180° between the lamella and its associated holding element. Preferably, the holding element connects to the lamella directly or is fastened to it. In a particularly preferred embodiment, the lamella element is designed as a single piece, so that in this regard the lamella and the holding element are made as a single piece and/or of the same material. For example, an attachment of the lamella associated with the holding element is realized by means of said element.

In an embodiment of the invention, it is provided that at least one of the lamellas at its end facing away from the support piece has a lamella head, which is formed by a stepped portion of the lamella. Preferably, each of the lamellas has a lamella head of this kind. The lamella head is located at the end of the particular lamella, said end facing away from the support piece or said end facing the vehicle interior. The lamella head is formed by a stepped portion of the lamella, whereby the stepped portion is understood to be, for example, a recess or a notch, so that there is a step in the lamella, whereby the lamella head, when viewed in cross section, has greater dimensions than the other regions of the lamella located on the stepped portion side facing away from the lamella head. The lamella head is used in particular for the visual improvement of the lamella and in this regard is made as a decorative element.

For example, the lamella head at least in some areas is made from a material that is different from the material of other areas of the lamella. It can also be provided that an attachment part, in particular a plug-on part, is placed on or attached to the lamella head. For example, the lamella at its lamella head has a holding protrusion for this purpose, onto which the decorative part is pushed or pressed. In the latter case, the decorative part is held frictionally on the lamella. Of course, the attachment of the decorative part on the lamella can be designed as desired, for example, in a positive, frictional, and/or bonding manner. The decorative part can be formed of the same material as the lamella. Preferably, however, it is made of a different material. For example, the lamella can be formed of plastic, whereas the decorative part can be formed of metal or has at least a metallic appearance.

It is provided in an embodiment of the invention that a connecting element of the support piece is attached to the lamella head, in particular the stepped portion. In this case, the connecting element of the support piece adjoins particularly preferably the lamella head or the stepped portion. The lamella in this regard is attached preferably at two places, namely, on the one side, via the holding element and, on the other, via the connecting element. The connecting element is preferably located between two adjacent or directly adjacent lamellas or lamella elements and connects these to one another. Outermost lamellas, therefore, for example, the lamellas located at the very top or very bottom in the panel, can be attached in a different manner to the support piece, to which end said part preferably has an element at least similar to the connecting element.

An embodiment refinement of the invention provides that the connecting element is attached at its end, facing away from the lamella head, to the holding element. As already described above, the connecting element is attached to the lamella head and in this case preferably adjoins it. At the other end, when viewed in cross section, therefore, the end facing away from the lamella head, the connecting element is to be attached to the holding element and thereby preferably to adjoin it. In this regard, directly adjacent lamellas are preferably connected to one another via the connecting element, whereby the connecting element adjoins the lamella head of one of the lamellas and the holding element associated with the other lamella. In this regard, the corresponding lamella or lamella element is securely attached.

It can be provided further that the light absorption compartment, when viewed in cross section, is bounded by the holding element and the connecting element. In this regard, the holding element and the connecting element enclose the light absorption compartment between them at least in some areas. This means that the holding element is arranged spaced apart from the connecting element at least in some areas in order to form the light absorption compartment.

It can also be provided that a connecting element surface, facing the light absorption compartment and/or the interspace, can be curved such that light striking it is reflected in the direction of the light absorption compartment. This should be the case at least if the light or the relevant light beam originates from a position that is above an observer's viewing position. But because in the vehicle interior the light typically reaches the panel from above, a very reliable elimination of highlights can occur with a light absorption compartment, which in each case engages the bottom lamella from behind.

When viewed in cross section, the connecting element can be continuously curved starting from a first point, where it adjoins a first lamella, to a second point, where is adjoins a second lamella, directly adjacent to the first lamella. The curvature in this case occurs in particular for a wall, facing the light absorption compartment, or a surface of the connecting element. The degree of curvature of the curvature in this case can be constant or, preferably, change continuously from the first point to the second point. The light is kept especially effectively in the light absorption compartment with the last embodiment.

The invention relates further to a ventilation arrangement for a motor vehicle, comprising a vent outlet, which has a plurality of vent lamellas, and a panel arranged adjacent to the vent outlet, in particular according to the preceding embodiments, with a plurality of lamellas attached to the panel support piece. It is provided in this case that at least one of the lamellas on a side facing the support piece is engaged from behind by a light absorption compartment at least in some areas. The ventilation arrangement was already discussed above. It has in particular the vent outlet or a plurality of vent outlets. The panel is disposed adjacent to the vent outlet or vent outlets. Preferably, the panel connects to the vent outlet directly. The advantages of an embodiment of this type of the ventilation arrangement and the panel were already discussed. The ventilation arrangement and the panel can be refined according to the preceding embodiments, so that reference is made to them in this regard.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, and wherein the sole FIGURE illustrates an example embodiment, showing a schematic cross-sectional illustration of a panel for a vehicle interior.

DETAILED DESCRIPTION

FIG. 1 shows a schematic cross-sectional illustration of a panel 1 for a vehicle interior 2, in which an observer position 3 and a line of vision 4 originating from said position to panel 1 are indicated. Observer position 3 is shown here for a 95% man. An observer position 3 of this type occurs for persons who are taller than 95% of all assumed average observers, in particular car drivers.

Panel 1 is used in particular for covering at least one structural element 5, which is indicated here only by way of example. Panel 1 has a plurality of lamellas 6, which are attached to a support piece 7 of panel 1, in particular to one another and/or to the at least one structural element 5. Lamellas 6 are each preferably part of a lamella element 8, which has a holding element 9, apart from the corresponding lamella 6. Said holding element 9 here has the design of a holding foot and is angled relative to the lamella, therefore is at an angle greater than 0° and smaller than 180° to it.

A decorative element 10, moreover, which is attached to respective lamella 6, is associated with lamella element 8. For example, each lamella element 8 has a decorative element 10 of this type. In the exemplary embodiment illustrated here, however, this is the case only for part of lamella elements 8. Decorative part 10 can be formed, for example, of a material that is different from the material of lamella element 8 or lamellas 6. For example, lamella element 8 can be formed of plastic, whereas decorative part 10 can be formed of metal or has at least a metallic appearance.

Lamellas 6 are arranged parallel to one another. Each of them has a lamella head 11, which is formed on the side, facing vehicle interior 2, of lamella 6 by a stepped portion 12. Stepped portion 12 is understood to be, for example, the formation of a step or a notch. Lamellas 6 or lamella elements 8 are connected to one another by connecting elements 13. Each connecting element 13 in this case adjoins lamella head 11, for example, stepped portion 12, on the one side, and holding element 9 of the directly adjacent lamella 6, on the other, or is attached there. Connecting elements 13 are used in this regard to connect directly adjacent lamellas 6 or directly adjacent lamella elements 8. Outermost lamellas 6 or lamella elements 8 can be attached in a different manner, for example, by means of elements 14 and 15 of support piece 7. Elements 14 and 15 in this case can be formed analogously to connecting elements 13.

It becomes clear that directly adjacent lamellas 6 enclose an interspace 16 between them. Panel 1 is now made such that disturbing light reflections and highlights are prevented at least partially, in particular completely. For this purpose, at least one of lamellas 6 but preferably all lamellas 6 are engaged from behind by a light absorption compartment 17. This means that light absorption compartment 17, preferably on the side, facing away from vehicle interior 2, of the respective lamella 6 or a respective end face 18 of lamella 6 has the shape of a hollow space.

Light absorption compartment 17 is preferably bounded jointly by holding element 9, connecting element 13, and/or lamella 6, in particular end face 18 of lamella 6. Light absorption compartment 17 in this case particularly preferably connects with interspace 16 or is fluidically connected with it. It becomes clear that light absorption compartment 17 in the exemplary embodiment illustrated here always engages from behind a bottom lamella of directly adjacent lamellas 6. In an embodiment of panel 1 of this type, light, coming in from above observer position 3 into interspace 16, can be reflected by lamellas 6 or lamella elements 8 and connecting element 13 such that it reaches light absorption compartment 17. Light absorption compartment 17 in this respect serves as a light trap from which the light cannot escape or can escape only with a greatly reduced intensity. Disturbing reflections and highlights on panel 1 are prevented in this manner.

It becomes clear, moreover, that a surface 19 of connecting element 13 or a surface 20 of element 14 is curved. The curvature of surface 19 and/or surface 20, when viewed in cross section, is preferably concave, therefore recedes away with respect to vehicle interior 2, so that light absorption compartment 17 is formed.

The curvature in this regard is selected in such a way that light striking surface 19 or 20 is reflected in the direction of light absorption compartment 17. In the FIGURE, this is shown by way of example for light beams 21, which begin above observer position 3 or line of vision 4 and reach interspace 16. Light beams 21 strike surface 19 at reflection points 22 and are reflected in the direction of light absorption compartment 17 or into it. It can be seen, moreover, in the FIGURE that a transition between structural element 5 and elements 14 and 15 can be designed visually attractively by means of cover elements 23. It is provided preferably that surfaces 19 and 20 are made matte at least in some areas, in particular completely. The incident light can be attenuated further in this manner.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A panel for a vehicle interior, the panel comprising:
   a support piece arranged on the panel;
   a plurality of lamellas fastened to the support piece of the panel,
   wherein a surface of at least one of the lamellas faces the support piece, and wherein a portion of the surface of the at least one of the lamellas that faces the support piece is engaged from behind by a light absorption compartment,
   wherein the portion of the surface of the at least one of the lamellas is engaged from behind by the light absorption compartment, such that after light from the vehicle interior has passed the at least one of the lamellas and enters the light absorption compartment behind the at least one of the lamellas, the light is absorbed.

2. A panel for a vehicle interior, the panel comprising:
   a support piece arranged on the panel;
   a plurality of lamellas fastened to the support piece of the panel,
   wherein a surface of at least one of the lamellas faces the support piece, and wherein a portion of the surface of the at least one of the lamellas that faces the support piece is engaged from behind by a light absorption compartment, and
   wherein the light absorption compartment originates from an interspace bounded by two adjacent lamellas of the plurality of lamellas.

3. The panel according to claim 1, wherein the at least one of the lamellas has a holding element extending from an end thereof at an angle.

4. The panel according to claim 1, wherein the light absorption compartment, when viewed in cross section, is bounded by a holding element of the at least one of the lamellas and a connecting element of the support piece.

5. The panel according to claim 4, wherein the holding element extends from an end of the at least one of the lamellas at an angle, and wherein one end of the connecting element directly contacts and is directly attached to the holding element.

6. The panel according to claim 4, wherein the light absorption compartment is bounded by a surface of the holding element that faces away from the vehicle interior and a surface of the connecting element that faces towards the vehicle interior, the surface of the holding element and the surface of the connecting element opposing each other.

7. The panel according to claim 2, wherein the two adjacent lamellas are arranged one above the other and the light absorption compartment engages a bottom and/or top lamella from behind.

8. A panel for a vehicle interior, the panel comprising:
   a support piece arranged on the panel;
   a plurality of lamellas fastened to the support piece of the panel,
   wherein a surface of at least one of the lamellas faces the support piece, and wherein a portion of the surface of the at least one of the lamellas that faces the support piece is engaged from behind by a light absorption compartment, and
   wherein the at least one of the lamellas has an end facing away from the support piece, the end facing away from the support piece having a lamella head, which is formed by a stepped portion of the at least one of the lamellas.

9. The panel according to claim 8, wherein one end of a connecting element of the support piece is attached to the lamella head or the stepped portion of the at least one of the lamellas.

10. The panel according to claim 9, wherein another end of the connecting element is attached to a holding element of another lamella that is adjacent to the at least one of the lamellas.

11. The panel according to claim 9, wherein a surface of the connecting element facing the light absorption compartment is curved such that light striking the surface is reflected in a direction of the light absorption compartment.

12. A ventilation arrangement for a motor vehicle, comprising:
   a vent outlet; and
   a panel according to claim 1 arranged adjacent to the vent outlet.

* * * * *